United States Patent [19]

Le Grand et al.

[11] 4,357,545

[45] Nov. 2, 1982

[54] REMOTE POWER SUPPLY SYSTEM FOR EQUIPMENT ON A TRANSMISSION LINE

[75] Inventors: Yves Le Grand, Trappes; René Migeon, Paris, both of France

[73] Assignee: Compagnie Industrielle des Telecommunications Cit-Alcatel, Paris, France

[21] Appl. No.: 200,625

[22] Filed: Oct. 27, 1980

[30] Foreign Application Priority Data

Oct. 26, 1979 [FR] France ................................ 79 26614

[51] Int. Cl.³ ............................................. H04B 3/44
[52] U.S. Cl. ...................................... 307/64; 307/130; 307/86
[58] Field of Search ....................... 307/64, 66, 68, 85, 307/86, 130; 340/333

[56] References Cited

U.S. PATENT DOCUMENTS 1,381,545  6/1921  Demarest .
3,662,182  5/1972  Ullmann et al. ....................... 307/64

FOREIGN PATENT DOCUMENTS 1267267  5/1968  Fed. Rep. of Germany .
1762599  11/1970  Fed. Rep. of Germany .

*Primary Examiner*—Gene Z. Rubinson
*Assistant Examiner*—James L. Dwyer
*Attorney, Agent, or Firm*—Sughrue, Mion, Zinn, Macpeak & Seas

[57] ABSTRACT

The present invention is concerned with maintaining the power supply to equipments along at least a section of a transmission line in the event of said line being cut. Each equipment (5) along the line (1) is provided with a local power supply circuit (6,7,9) inserted in the remote power supply loop at the equipment under consideration. A looping impedance (10) is connected in series with the break contacts (11,12) of a controlled switch and parallel across the power supply loop in such a manner as to create a partial power supply loop through the local power supply circuit when the switch is closed. Control means are provided to close the switch in the event of a power failure in the local power supply circuit, and to open the switch again only once the downstream side of the power supply loop draws current above a predetermined threshold value. The above circuit operates for a power supply loop that includes an energy source at one end (E) only of the transmission line. A variant embodiment of the invention operates in a transmission line where power may be drawn from either end. The invention is applicable to transmission circuits that include at least one branch of a point to point connection.

10 Claims, 3 Drawing Figures

REMOTE POWER SUPPLY SYSTEM FOR EQUIPMENT ON A TRANSMISSION LINE

The present invention concerns supplying power to remote equipments disposed along a transmission line, and more particularly, it concerns maintaining the supply of power, in the event of the line being cut, to those equipments which are located between the power supply and the break in the transmission line.

BACKGROUND OF THE INVENTION

Power is fed to equipment along a transmission line in a series of independent remote power supply sections. Each power supply section comprises a power supply loop running along its entire length. The loop is constituted by the conductors of the line and loops through a power supply source. Generally speaking, the power necessary to operate the equipments situated along a power supply section is extracted by means of local power supply circuits that are inserted in series in the power supply loop at the location of each equipment.

When a power supply loop is cut, for example because of a break in cable, all the equipments in the affected power supply section cease to operate since there is a break in their power supply. Remote fault finding systems cease to operate and cannot be used to locate the break within the affected power supply section, and communication cannot be maintained up as far as the break from either end of the line. This is disadvantageous if there is a branch circuit connected to the affected portion of the line.

Preferred embodiments of the present invention avoid these drawbacks.

SUMMARY OF THE INVENTION

The present invention provides a remote power supply system for powering remote equipment located at a point along a transmission line, said line being equipped with a remote power supply loop which passes through said point and which loops through a source of electrical energy. At said point the system includes
a first controlled switch.

A looping impedance is connected in series with the first controlled switch. Said series connection of switch and impedance are connected in parallel across the remote supply loop, thereby dividing the loop into two partial loops, one of which loops through the source of energy.

Two local power supply circuits are inserted in the remote supply loop, one on either side of the looping impedance. A first one of said local power supply circuits is inserted in the partial loop that loops through the source of energy and serves to supply power to the equipment in normal operation. The other, or second local power supply circuit is inserted in the other partial loop.

A control circuit for said first controlled switch, sensitive to the state of operation of each of the local power supply circuits, is arranged to close the first controlled switch when the first local power supply circuit is not in operation and to open the first controlled switch when both local power circuits are operating simultaneously.

The invention also provides a variant of the above system for remotely powering equipments located at a point along a transmission line, said line being equipped with a remote power supply loop which passes through said point and which, in the event of the loop being cut, is powered from both ends of the line. The variant has the same structure, but both of the local power supply circuits are capable of powering the equipment, and the control circuit for the controlled switch is arranged to close the controlled switch when at least one of the local power supply circuits is not operating and to open the switch when both are operating.

In the event that the remote power supply loop is cut, the automatic insertion of a looping impedance in the equipment nearest to the break and on the power supply side thereof, ensures that a partial remote power supply loop is reconstituted, thereby maintaining the supply of power to equipments disposed between the power supply and the break. Clearly, if power is fed from both ends, respective partial power supply loops will be reconstituted on either side of the break.

BRIEF DESCRIPTION OF THE DRAWINGS

Two embodiments of the invention are described by way of example with reference to the accompanying drawings in which.

DESCRIPTION OF PREFERRED EMBODIMENTS

Figure 1:
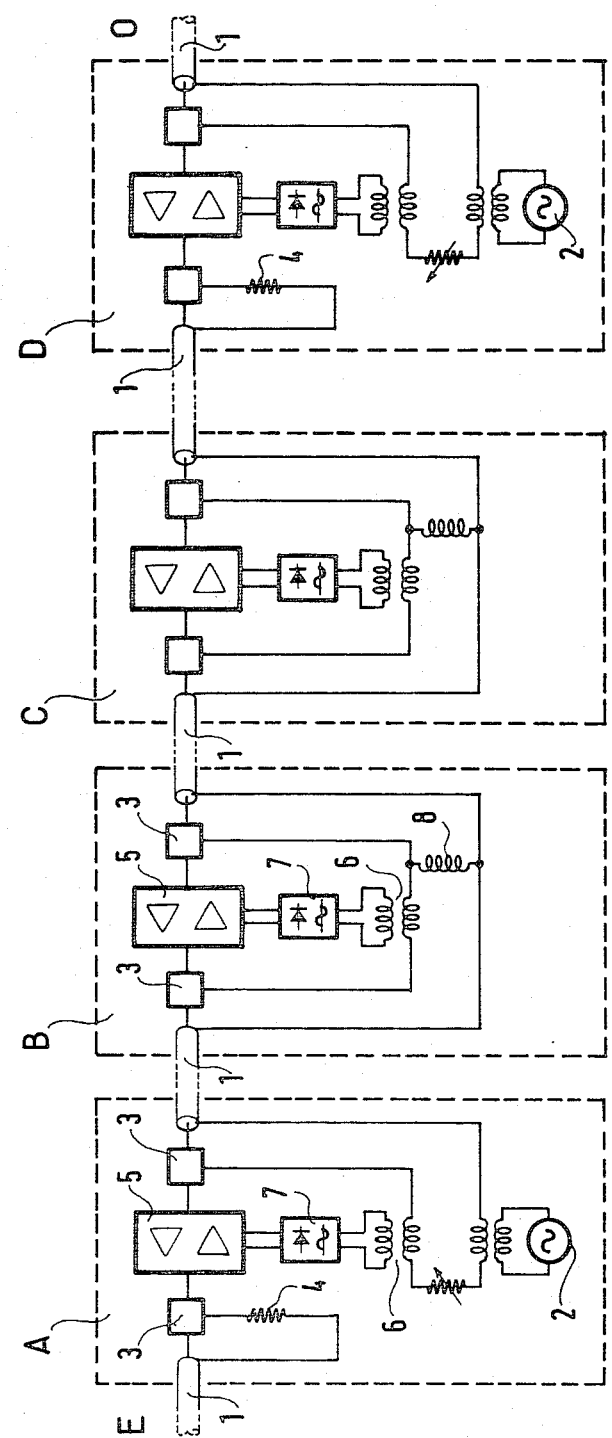
FIG. 1 is a circuit diagram of an AC power supply section of a communication link using a coaxial pair with repeaters.

FIG. 1 shows a portion of a two-way transmission line of the n+n using a coaxial pair 1 equipped with a succession of amplifying stations A, B, C and D that are remotely powered using AC. Stations A and D are main stations constituting the ends of a conventionally structured remote power supply section having intermediate stations B and C whose numbers have been reduced to simplify the figure. This remote supply section includes a source of alternating current 2 disposed at the main station A, i.e. at the end E, and a remote power supply loop ending at this source 2 extends over the portion of line that lies between the main stations A and D. In between stations, the remote power supply loop is constituted by the inner and outer conductors of the coaxial pair 1, and inside the stations the loop is constituted by branch conductors connected to input-output terminals of the stations via power/signal filters 3. The loop is closed at the main station D by means of a short circuit 4.

The power/signal filters 3 are well known. They have three terminals: a terminal that is common to the signal and to the remote power supply content and connected to the inner conductor of the coaxial pair; a "signal" terminal connected to an input-output of a two-way signal amplifier 5; and a remote power supply terminal. Such filters comprise a high-pass filter connected between the common terminal and the signal terminal, and a low-pass filter connected between the common terminal and the remote power supply terminal.

The power necessary for the equipment at stations A, B and C, and particularly for the two-way amplifier 5 for the signal, is extracted from the remote power supply source by means of local power supply circuits inserted in series in the shunt paths that interconnect the power supply terminals of the power/signal filters 3 of each station. The local power supply circuits comprise, in conventional manner, a current transformer 5 with a primary winding inserted between the power supply terminals of the power/signal filters 3 arranged on either side of the two-way signal amplifier 5 of the station under consideration, and having a secondary winding which supplies power to a rectifier circuit 7 that supplies the various required power voltages.

An inductance 8 is connected in each remotely powered station B, C, in shunt across the remote power supply loop in order to compensate reactive losses due to the capacitance of the coaxial pair 1 and of the associated equipment, and in order to improve the power factor of the AC remote power supply loop.

With a remote supply section as shown in FIG. 1, a break in the connection, for example due to a break in the coaxial pair 1, removes the supply of power to the line equipments and consequently, as indicated above, prevents remote fault finding systems from operating, and also interrupts any branch connections even if they are not directly affected by the cable break. In order to avoid this loss of power supply, at least for those equipments that are located between the break and the source of AC, it is necessary in the event of a break, to loop the power supply circuit at the last station before the break.

Figure 2:
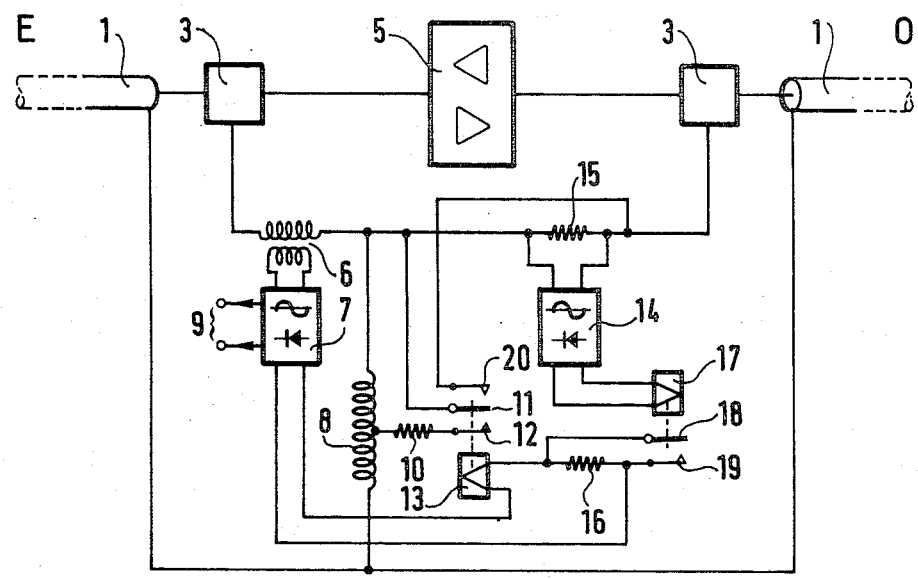
FIG. 2 is a circuit diagram with a power supply system in accordance with the invention, for use with the remote supply section shown in FIG. 1.

FIG. 2 is a circuit diagram of a remote power supply circuit capable of performing such a looping operation at a remotely powered station which receives power from one end E of its cable. FIG. 2 shows:

a two-way signal amplifier 5 representing the station equipment;

two power/signal filters 3 inserted between the input-outputs of the two-way amplifier 5 and the inner conductors of the coaxial pairs 1;

a local power supply circuit constituted by a rectifier circuit 7 which supplies the DC required to power the station equipment the DC appears on terminals 9 which, for simplicity in the drawing, are not shown connected to the equipment; and a current transformer 6 whose primary winding is connected in series between the power supply terminals of the power/signal filters 3 and whose secondary winding supplies power to the rectifier circuit 7; and an inductance 8 inserted in shunt across the remote power supply loop between the primary of the current transformer 6 and the outer conductors of the coaxial pairs 1 which are electrically interconnected.

FIG. 2 also shows:

a series connection constituted by a looping resistance 10 and a controlled switch constituted by the moving spring 11 and the break spring 12 of a relay 13, and connected in parallel with a portion of the inductance 8;

a second local power supply circuit comprising a rectifier circuit 14 powered from a voltage appearing across the terminals of a resistance 15 inserted in the remote supply loop after the primary of the current transformer 6, downstream from the inductance 8;

a second controlled switch connected in parallel with the resistance 15 and constituted by the moving spring 11 and the make spring 20 of the relay 13; and a circuit for controlling the controlled switches and constituted by the operating winding of the relay 13 and its excitation circuit which are powered from the local power supply circuit that includes the rectifier circuit 7.

The excitation circuit includes a series resistance 16 and a relay 17 powered by the rectifier circuit 14 of the second local power supply circuit and whose moving spring 18 and make spring 19 are arranged to short circuit the resistance 16.

When the looping resistance 10 is connected in parallel across a portion of the inductance 8, it constitutes a shunt for the remote power supply alternating current. The value of the resistance is chosen, taking into account the auto-transformer effect of its parallel connection across a portion of the inductance 8, so that it appears to the remote source of AC to have an impedance similar to that of the part of the remote supply loop which it short-circuits.

The value of the resistance 16 is such that when inserted in the excitation circuit of the relay 13, it enables the relay 13 to be held by the rectifier circuit 7, but it prevents the relay from being operated if not already operated.

The resistance 15 is of low value, but of sufficient value to ensure that when it is not short-circuited and the remote power supply current flows therethrough it develops sufficient voltage across its terminals after rectification to operate the relay 17. This should preferably occur at a value of remote power supply current which is below that required to enable the relay 13 to be operated when the resistance 16 is short circuited.

In the absence of an alternating remote supply voltage from the end E, i.e. from the direction at which the remote source of AC is assumed to lie, neither of the rectifier circuits 7 and 14 of the local power supply circuits can operate, therefore the relays 13 and 17 are released, the resistance 15 is inserted in the remote supply loop, and the looping resistance 10 is connected to the terminals of the inductance 8.

When an alternating voltage is applied to the end E, the primary winding of the transformer 6 passes an alternating current, part of which returns towards the end E via the looping resistance 10, the inductance 8 and the outer conductor of the coaxial pair 1, while the other part flows through the resistance 15 towards the power/signal filter 3 and the end O.

If there is no fault on the power supply section between the power supply source and the amplifier station under consideration, that part of the alternating current which flows through the current transformer 6 and returns towards the end E via the looping resistance 10 and the inductance 8 is sufficient to ensure proper operation of the first local power supply circuit which is constituted by the current transformer 6 and the rectifier circuit 7.

If there is no break in the connection towards the following amplifier station towards the end O, that part of the current which passes through the resistance 15 rises to a sufficient value to excite the relay 17 via the rectifier circuit 14 of the second local power supply circuit. The relay 17 then switches to the operated position and short circuits the resistance 16, thereby enabling the relay 13 to be excited by the rectifier circuit 7 of the first local power supply circuit. The relay 13 then switches to the operated position, thereby disconnecting the looping resistance 10 and short circuiting the resistance 15. The primary of the current transformer 6 is then directly connected between the power/signal filters 3. Further, short circuiting the resistance 15 causes the second local power supply circuit to cease operating, thereby releasing the relay 17 and reinserting the resistance 16 in the excitation circuit of the relay 13 which holds at a lower excitation current.

If, in contrast, there is a break in the connection to the following amplifier station towards the end O, that part of the current which flows through the resistance 15 is of low intensity, having a value insufficient to bring the second local power supply circuit into operation to excite the relay 17. This results in the relay 13 being left in the released position, thereby maintaining the looping resistance 10 permanently connected to the terminals of the inductance 8 which then operates as an auto-transformer. The looping resistance 10 closes the remote power supply loop and ensures that sufficient current flows through the primary of the current transformer 6 for the rectifier circuit 7 to operate suitably.

When the remote power supply section is not operating, i.e. when the AC power supply source is not in service, all the looping resistances of the amplifier stations powered by that section are connected in shunt across the power supply loop.

When the power supply section is powered up, the voltage delivered by the AC power supply source rises so that the current reaches its nominal value, with the amplifier station nearest to the source being the first to be normally powered, since the others have looping resistances between them and the source diverting a greater or lesser part of the remote power supply current. In the first station, some of the remote power supply current flows towards the following stations thereby releasing the looping resistance. This then enables the following station to be normally powered with some remote power supply current flowing towards the amplifier stations that are placed further downstream therefrom, thus releasing its looping resistance, and so on. The looping resistances are released one after another getting further away from the source until the last amplifier station of the section is powered.

A break in the remote power supply section interrupts the supply power to all the amplifier stations of the section, and consequently causes all the looping resistances to be switched into circuit. This action reestablishes sufficient remote supply current for the nearest amplifier station to the AC source, providing the break is not situated between the source and the nearest station. Further, if the break is not situated between the nearest station and the following station, there will be flow of remote supply current from the nearest station towards the following stations that enables the looping resistance of the nearest station to be released. The looping resistances are thus released successively until the amplifier station immediately preceding the break is reached. In this last station there is no, or at least no significant, flow of current towards stations located further away from the power supply source, thus the looping resistance of the last station before the break is not released and remains as the sole looping resistance connected across the remote supply loop.

Figure 3:
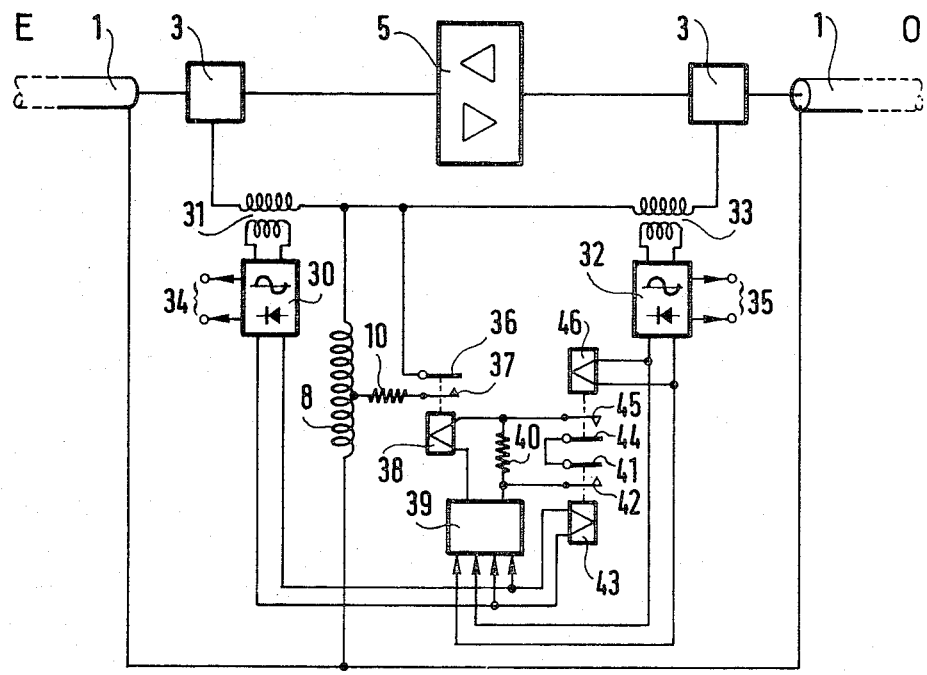
FIG. 3 is a circuit diagram of a variant of the systems shown in FIG. 2, said variant being for use in a remote power supply section that is powered both of its ends in the event of a break.

With the remote supply system that has just been described with reference to FIG. 2, power is only reestablished for those amplifier stations of a remote supply section that are situated between the AC power source and the break. The nearer the break is to the power supply source, the more inconvenient this situation can be. FIG. 3 is a circuit diagram of a remotely powered station in a system which avoids this drawback.

This remote power supply system is intended for stations in a remote supply section that are normally supplied with power from one end of the section, but which are supplied with power from both ends in the event of a break, there being an emergency source of AC at the opposite end of the power supply loop from the end at which the normal AC supply is located. Assuming, as in FIG. 1, that the remote power supply section extends between two main stations A and D and that the normal power supply is located in the main station A, the emergency power supply will be located in the main station D and will automatically be connected in place of the short circuit 4 in the event of a cable break. This occurs under the control of a circuit that measures the remote supply current flowing through the short circuit 4.

FIG. 3 shows the same signal amplifier 5 representative of the equipment at a remotely powered amplifier station, and having input-output terminals connected via power/signal filters 3 to the inner conductors of coaxial pairs 1 connected to the station under consideration.

Power may be obtained from either one of two identical local power supply circuits which are inserted in series in the power supply loop between the power supply terminals of the filters 3 and are represented by a first rectifier circuit 30 powered by the primary of a first current transformer 31 and by a second rectifier circuit 32 powered by the primary of a second current transformer 33. One or other fof the rectifier circuits 30, 32 supplies all the power supply voltages required by the equipment at the amplifier station under consideration via a diode coupling circuit (not shown) which prevents either of the rectifier circuits from feeding power to the other and which is connected to the output terminals, e.g. 34, 35 of the rectifier circuits 30,32. The primary windings of the current transformers 31,33 are connected in series between the remote supply terminals of the filters 3.

An inductance 8 is, as before, connected in shunt across the remote supply loop to improve its power factor. It is connected between the point interconnecting the primaries of the current transformers 31 and 33, and the outer conductors of the coaxial pairs 1 which are electrically interconnected.

A series circuit, constituted by a looping resistance 10 and a controlled switch comprising the moving spring 36 and the break spring 37 of a relay 38, is placed in parallel across a portion of the inductance 8.

The excitation circuit for the operating coil of the relay 38 controls the use or the release of the looping resistance 10, and is powered by either one of the first or the second rectifier circuits 30,32 of the local power supply circuits via a coupling circuit 39 using diodes to avoid either of the local power supply circuits from feeding power into the other. It includes a series resistance 40 that is shunted by two controlled switches that are connected in series and are constituted by the moving spring 41 and the make spring 42 of a relay 43 which is powered solely from the first rectifier circuit 30 and by the moving spring 44 and the make spring 45 of a relay 46 that is powered solely by the second rectifier circuit 32.

The resistance 40 has a value such that when inserted in the excitation circuit of the relay 38, it enables the relay to be held in the operated position but does not enable the relay to be operated from the released positon by either of the local power supply circuits.

The looping resistance 10 is chosen so that when it is connected, it shunts sufficient remote power supply current to ensure normal operation of a local power supply circuit.

In the absence of an alternating voltage at the remote power supply frequency between the conductors at the ends of the coaxial pairs 1 connected to the amplifier station under consideration, neither the first nor the second rectifier circuits 30,32 of the local supply circuits operates. The relays 38,43 and 46 are all at rest and the looping resistance 10 is shunted across the remote power supply loop via the inductance 8. Thus when the remote supply section is not in operation, all of the looping resistances in the amplifier stations of the section are shunted across the remote supply loop.

The amplifier station under consideration receives power from only one end at a time. It receives power from the end E when power is supplied by the normal AC power supply source, and the emergency AC power supply source is disconnected, either in the course of normal operation or by a break in the cable. Otherwise, it receives power from the end O when powered by the emergency AC power supply source, with the normal power supply source being isolated from the amplifier station under consideration by a break.

When the amplifier station is remote powered from the end E, the normal power supply source applies an alternating voltage at the remote supply frequency across the inner and outer conductors of the coaxial pair 1 connected to the side E. The appearance of this alternating voltage causes alternating current flow through the primary of the current transformer 31, with a part of this current flowing through the looping resistance 10 and the inductance 8 to return towards the end E via the outer conductor of the coaxial pair 1, and with another part of the current flowing through the primary winding of the second current transformer 33 towards the power/signal filter 3 on the side O. When the voltage rises to reach its nominal value, the current passing through the primary of the first current transformer 31 increases to reach a first value that enables the first rectifier circuit 30 to supply sufficient current to the relay 43 to switch it to the operated position, and then to reach a second value enabling the first rectifier circuit 30 to provide normal power to the equipment at the station under consideration and to the excitation circuit of the relay 38 which remains in the unoperated position because of the resistance 40. The second value is necessarily reached by virtue of the looping resistance 10 connected in shunt as soon as the alternating voltage at the remote supply frequency reaches its nominal value at the side E.

If there is no break on the way to the following amplifier station moving away from the normal power supply source, the current intensity passing through the primary of the second current transformer 33 is sufficient to operate the relay 46 via the second rectifier circuit 32, thereby short circuiting the resistance 40 and enabling the relay 38 to be operated by the first rectifier circuit 30 thus releasing the looping resistance 10.

If there is a break on the way to the following amplifier station away from the normal power supply source, the intensity of current passing through the primary of the second current transformer 33 remains insufficient to enable the relay 46 to be operated thereby preventing operation of the relay 38 by means of the first rectifier circuit 30. The looping resistance 10 remains in circuit ensuring sufficient a current flow through the primary of the first current transformer 31 to enable the first recitifier circuit 30 to provide normal power to the equipment of the amplifier station under consideration.

When the amplifier station is remote powered from the end O, the emergency power supply source provides an alternating voltage at the remote supply frequency across the inner and outer conductors of the coaxial pair 1 connected to the side O. The appearance of this alternating voltage causes an alternating current to flow through the primary of the second current transformer 33, with a part of this current flowing through the looping resistance 10 and the inductance 8 to return towards the end O via the outer conductor of the coaxial pair 1, and with another part of the current flowing through the primary wind of the current transformer 31 towards the power/signal filter 3 at the side E. As this alternating current increases to reach its nominal value, the intensity of the current passing through the primary of the second current transformer 33 also increases to reach a first value enabling the second rectifier circuit 32 to supply sufficient power to the relay 46 to switch it to the operative position, and then reach a second value enabling the second rectifier circuit 32 to supply power normally to the equipment of the amplifier station under consideration, and to the excitation circuit of the relay 38 which remains in the released position because of the resistance 40. The second value is necessarily reached by virtue of the looping resistance 10 connected in shunt, as soon as the alternating voltage at the remote supply frequency reaches its nominal value at the side O.

If there is no break in the direction of the next amplifier station going away from the emergency AC power supply source, the intensity of the current passing through the primary of the first current transformer is sufficient to operate the relay 43 via the first rectifier circuit 30, thereby short-circuiting the resistance 40 and enabling the relay 38 to operate on current drawn from the second rectifier circuit 32, thus releasing the looping resistance 10.

If there is a break towards the adjacent amplifier station going away from the emergency power supply source, the intensity of the current flowing through the primary of the first current transformer 31 remains insufficient to enable the relay 43 to be operated thereby preventing operation of the relay 38 by the second rectifier circuit 32. The looping resistance remains connected ensuring a sufficient flow of current through the primary of the second current transformer 33 to enable the second rectifier circuit 32 to supply power normally to the equipment of the amplifier station under consideration.

When a remote power supply section is powered up, the connection of the normal power supply souce while the emergency power supply source is disconnected and replaced by a short circuit, causes the looping resistances to be successively released beginning with that in the remote supply station nearest to the normal power supply source, in a manner analogous to that already described with reference to FIG. 2.

If the connection is broken in the power supply section under consideration, the flow or remote power supply current is interrupted, thereby causing simultaneous connection of all the looping resistances of the amplifier stations in the section, and also causing the emergency power supply source to be connected at the opposite end of the power supply loop from that at which the normal power supply source is located.

The connection of the looping resistances re-establishes sufficient remote supply current flow in the nearest amplifier station to the normal power supply source if the break is not located in between them. Likewise, if the break is not situated between the said amplifier station and the next, the flow of remote supply current towards the following stations enables the looping resistance of the first station to be released. The looping resistances are thus successively released moving away from the normal power supply source until the amplifier station immediately preceding the break is reached. In this station the looping connection is maintained since there is too small a flow of remote supply current towards the following amplifier stations. A first partial remote supply loop is thus reconstituted based on the normal power supply source for those amplifier stations which are situated between the normal source and the break.

The connection of the looping resistances and the emergency power supply source re-establishes sufficient remote supply current for the nearest amplifier station to the emergency power supply source (i.e. the last station) if the break is not located in between them. Further, if the break is not situated between the last amplifier station and the preceding one, the flow of remote supply current towards the preceding amplifier stations enables the looping resistance of the last station to be released. The looping resistances are thus successively released going away from the emergency power supply source until the amplifier station immediately after the break is reached, and in this amplifier station the looping connection is maintained since too little remote power supply current flows towards the preceding amplifier station. A second partial remote power supply loop is thus re-established on the basis of the emergency power supply source for those amplifier stations which are situated between break and the emergency power supply source.

Between them, the two partial remote power supply loops re-establish the supply of power to all the amplifier stations of the power supply section in which a break has occurred.

When the remote power supply is arranged to operate at constant current, and the looping resistances are all equal, it is easy to locate the faulty amplifier station of a section of line by merely measuring the voltage across the terminals of the normal power supply source.

The remote supply system described with reference to FIG. 3 may be modified in various ways without altering its operation. The relays 43 and 46 consume little current and may be provided with individual power supply circuits, each constituted as for the power supply system shown in FIG. 2, by a rectifier circuit powered from the voltage appearing across the terminals of a resistance inserted in the remote power supply current circuit in between the primary of the first current transformer 31 and the inductance 8 for the relay 43 and in between primary of the second current transformer 33 and the inductance 8 for the relay 46. Both of the resistances should be short circuited by an additional pair of make contacts on the relay 38.

The various relays used in the remote power supply systems shown in FIGS. 2 and 3 may be replaced by semiconductor devices, e.g. thyristor circuits controlled by logic circuits, by current sensors placed in the part of the remote supply current between the power supply current terminals of the power/signals filters on either side of the inductance 8, or more generally on either side of the point at which the looping resistance 10 is connected.

We claim:

1. A remote power supply system for powering remote equipment located at a point along a transmission line, said transmission line being equipped with a remote power supply loop which passes through said point and which loops through a source of electrical energy, the system including at said point:
   a first control switch;
   a looping impedance connected in series with the first controlled switch, means connecting said series connection of switch and impedance in shunt across the remote supply loop, thereby dividing the remote supply loop into two partial loops, one of which includes the source of energy;
   two local power supply circuits within the remote supply loop, one on either side of the looping impedance, a first one of said local power supply circuits being within the partial loop that includes the source of energy and serving to supply power to the equipment in normal operation, the other, second local power supply circuit being within the other partial loop; and
   a control circuit for said first controlled switch, the control circuit including means sensitive to the state of operation of each of the local power supply circuits and including means for closing the first controlled switch when the first local power supply circuit is not in operation and for opening the first controlled switch when both local power circuits are operating simultaneously.

2. A remote power supply system according to claim 1, further including a second controlled switch, in the remote power supply loop in parallel with the second local power supply circuit and wherein the control circuit for the first controlled switch including means for controlling said second controlled switch for operation oppositely to said first controlled switch.

3. A system according to claim 1, for remotely powering equipment located at a point along a transmission line equipped with a remote power supply loop which loops through a source of AC power, and comprising at said point an inductance arranged in shunt across said remote power supply loop to improve its power factor, and wherein said series connection of looping impedance and first controlled switch is connected in parallel with the remote supply loop by means of a portion of the inductance which then operates as an auto-transformer whenever the first controlled switch is closed.

4. A remote power supply system according to claim 1, wherein the first controlled switch is constituted by the break contacts of a first relay and wherein the control circuit for the first controlled switch is constituted by the excitation circuit of the first relay which is powered from the first local power supply circuit and which includes a series resistance shunted by the make contacts of a second relay powered from the second local power supply circuit.

5. A remote power supply system according to claim 4, further including a second controlled switch disposed in the remote power supply loop in parallel with the second local power supply circuit and constituted by the make contacts of the first relay.

6. A remote power supply system for powering remote equipment located at a point along a transmission line, said transmission line being equipped with a remote power supply loop which passes through said point and which, in the event of the loop being cut, is powered from both ends, the system including at said point:
- a first controlled switch;
- a looping impedance connected in series with the first controlled switch, said series connection of switch and impedance being shunted across the remote supply loop;
- two local power supply circuits inserted in the remote supply loop, one on either side of the looping impedance, one or other of said local power supply circuits serving to supply power to the equipment in normal operation, and;
- a control circuit for said first controlled switch, the control circuit being sensitive to the state of operation of each of the local power supply circuits, and including means for closing the first controlled switch when at least one of the local power supply circuits is not operating and for opening the first controlled switch when both of the local power supply circuits are operating.

7. A system according to claim 6, for remotely powering equipment located at a point along a transmission line equipped with an AC remote power supply loop, which, in the event of the loop being cut, is powered from both ends, and comprising at said point an inductance arranged in shunt within said AC remote power supply loop to improve its power factor, and wherein said series connection looping impedance and first controlled switch is connected in parallel with the remote supply loop by means of a portion of the inductance which then operates as an auto-transformer whenever the first controlled switch is closed.

8. A remote power supply system according to claim 6, wherein the first controlled switch is constituted by the moving contacts of a first relay and wherein the control circuit for the first controlled switch is constituted by the excitation circuit of the first relay which is powered from one or the other of the local power supply circuits via a coupling circuit and which includes a series resistance shunted by the make contacts of a second relay themselves in series with the make contacts of a third relay, the second relay being powered solely by the first local power supply circuit and the third relay being powered solely by the second local power supply circuit.

9. A remote power supply system according to claim 6, wherein the first controlled switch is constituted by the break contacts of a first relay and wherein the control circuit for the first controlled switch is constituted by the excitation circuit of the first relay which is powered from one or other of the local power supply circuits via a coupling circuit which includes: a series resistance shunted by the make contacts of a second relay themselves in series with the make contacts of a third relay, the second and third relays being provided with individual power supply circuits, each inserted in the remote power supply loop, the second relay's power supply circuit being inserted between the first local power supply circuit and the said series circuit constituted by the looping impedance and the controlled switch, and the third relay's power supply circuit being inserted between the second local power supply circuit and the said series circuit constituted by the looping impedance and the controlled switch.

10. A remote power supply system according to claim 9, further including a second controlled switch disposed in shunt across the individual power supplies of the second and third relays and constituted by a supplementary make contact spring set of the first relay.

* * * * *